(12) United States Patent
Wada

(10) Patent No.: US 12,287,995 B2
(45) Date of Patent: Apr. 29, 2025

(54) INFORMATION PROCESSING DEVICE AND INFORMATION PROCESSING PROGRAM

(71) Applicant: FUJIFILM CORPORATION, Tokyo (JP)

(72) Inventor: Manabu Wada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/263,717

(22) PCT Filed: Feb. 7, 2022

(86) PCT No.: PCT/JP2022/004641
§ 371 (c)(1),
(2) Date: Aug. 1, 2023

(87) PCT Pub. No.: WO2022/176668
PCT Pub. Date: Aug. 25, 2022

(65) Prior Publication Data
US 2024/0118848 A1    Apr. 11, 2024

(30) Foreign Application Priority Data
Feb. 17, 2021 (JP) ................................. 2021-023747

(51) Int. Cl.
*G06F 3/12* (2006.01)
(52) U.S. Cl.
CPC .......... *G06F 3/1273* (2013.01); *G06F 3/1205* (2013.01); *G06F 3/1259* (2013.01)
(58) Field of Classification Search
CPC ..... G06F 3/1273; G06F 3/1205; G06F 3/1259
See application file for complete search history.

(56) References Cited

U.S. PATENT DOCUMENTS

2006/0077417 A1    4/2006  Nakata et al.
2008/0282065 A1*   11/2008 Imamichi .............. G06F 3/1285
                                            712/E9.016
(Continued)

FOREIGN PATENT DOCUMENTS

JP    2006-107293 A    4/2006
JP    2018-64195 A     4/2018
(Continued)

OTHER PUBLICATIONS

English language translation of the following: Office action dated Aug. 6, 2024 from the JPO in a Japanese patent application No. 2021-023747 corresponding to the instant patent application.This office action translation is submitted now in order to supplement the understanding of the cited references which are being disclosed in the instant Information Disclosure Statement.

*Primary Examiner* — John R Wallace
(74) *Attorney, Agent, or Firm* — SOLARIS Intellectual Property Group, PLLC

(57) ABSTRACT

Provided is an information processing device including a processor, in which the processor receive a setting for a job that is an instruction for executing a function, cause an operator associated with the setting for an executed job to be displayable on a history screen displaying a history of executed jobs, in a case in which an operator displayed on the history screen is operated, apply the received setting for the execution of a job corresponding to the operated operator, and change the display mode, on the history screen, of the operator associated with the setting for a job that has not been completed normally in accordance with a behavior of the job that has not been completed normally.

5 Claims, 28 Drawing Sheets

(56) References Cited

U.S. PATENT DOCUMENTS

| | | |
|---|---|---|
| 2011/0040716 A1 | 2/2011 | Kato |
| 2018/0217797 A1 | 8/2018 | Inoue |
| 2018/0220015 A1 | 8/2018 | Akuzawa |
| 2020/0159479 A1* | 5/2020 | Yoshida ................ G06F 3/1273 |
| 2021/0389913 A1* | 12/2021 | Kogure .................. G06F 3/121 |

FOREIGN PATENT DOCUMENTS

| | | |
|---|---|---|
| JP | 2018-125687 A | 8/2018 |
| JP | 2020-102761 A | 7/2020 |
| WO | 2009/057585 A1 | 5/2009 |

* cited by examiner

FIG.3

| EXECUTION RESULT NUMBER | TYPE | PINNABILITY | DESCRIPTION |
|---|---|---|---|
| 001 | FAILURE | PINNABLE | RE-EXECUTABLE BY REPAIRING IMAGE FORMING DEVICE |
| 002 | FAILURE | NOT PINNABLE | INCORRECT DESTINATION |
| 003 | FAILURE | NOT PINNABLE | COUNTERPART DEVICE DOES NOT RECEIVE |
| 004 | FAILURE | PINNABLE | LINE IS BUSY |
| ... | ... | ... | ... |

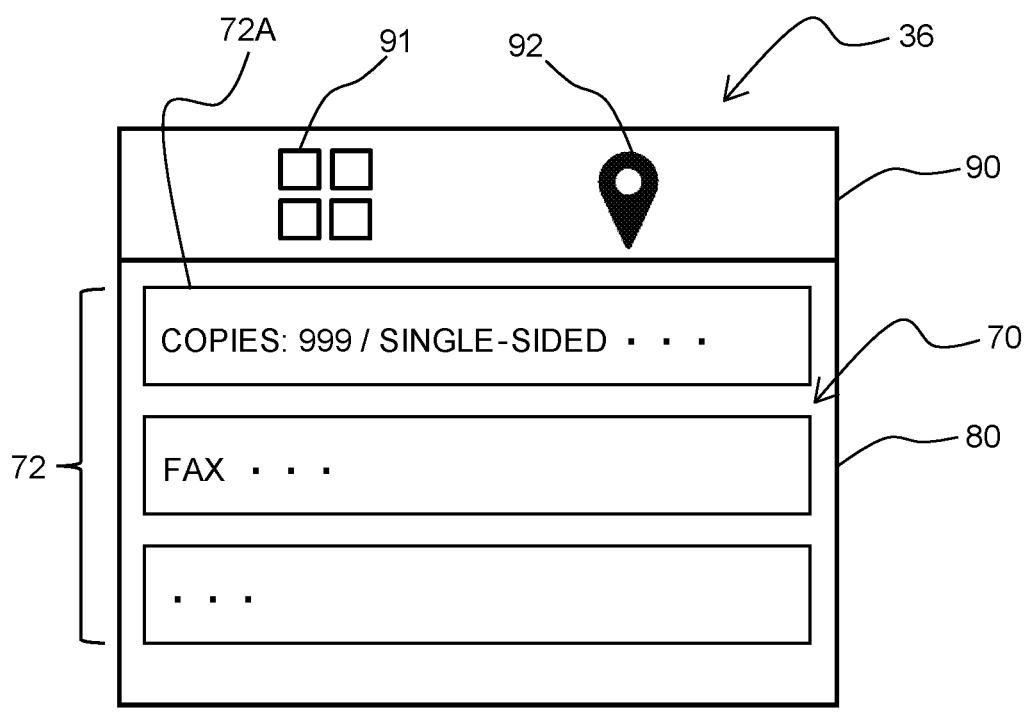

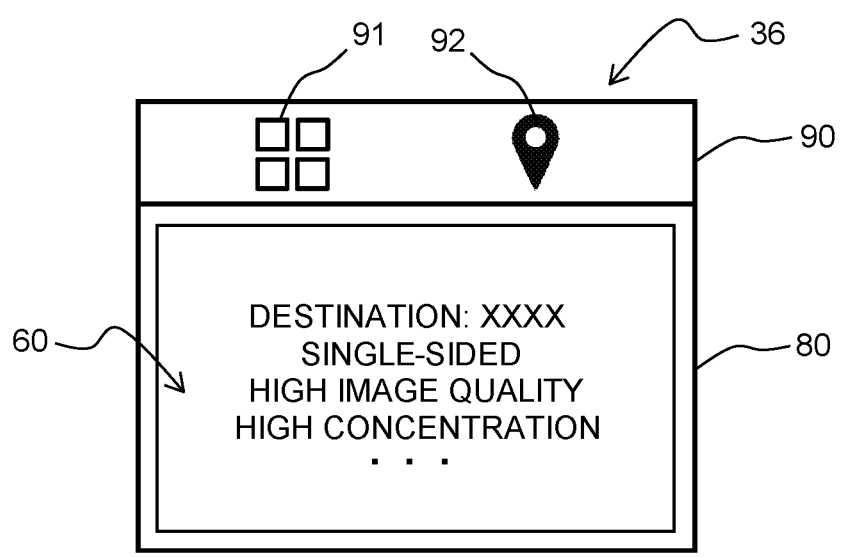

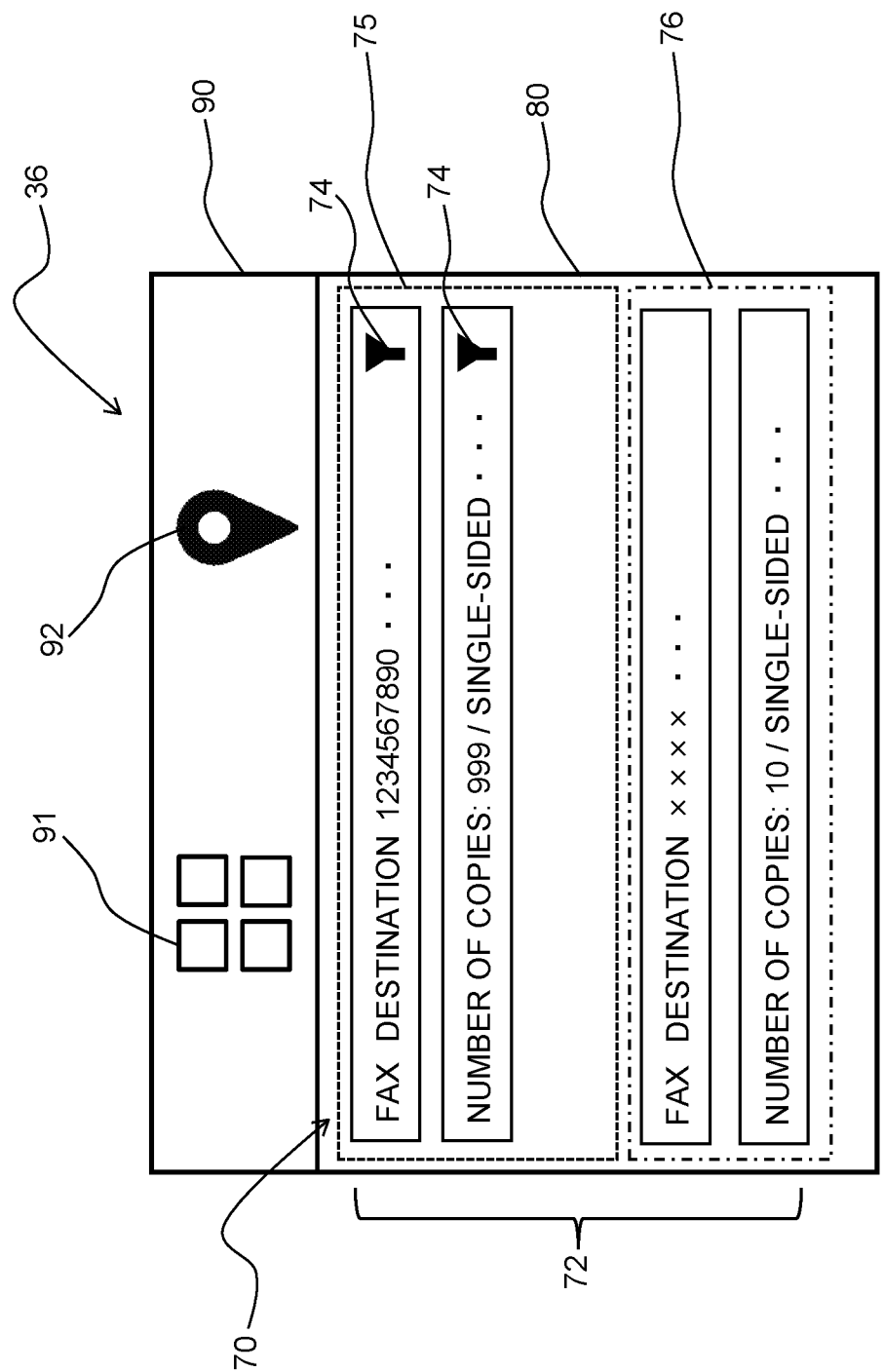

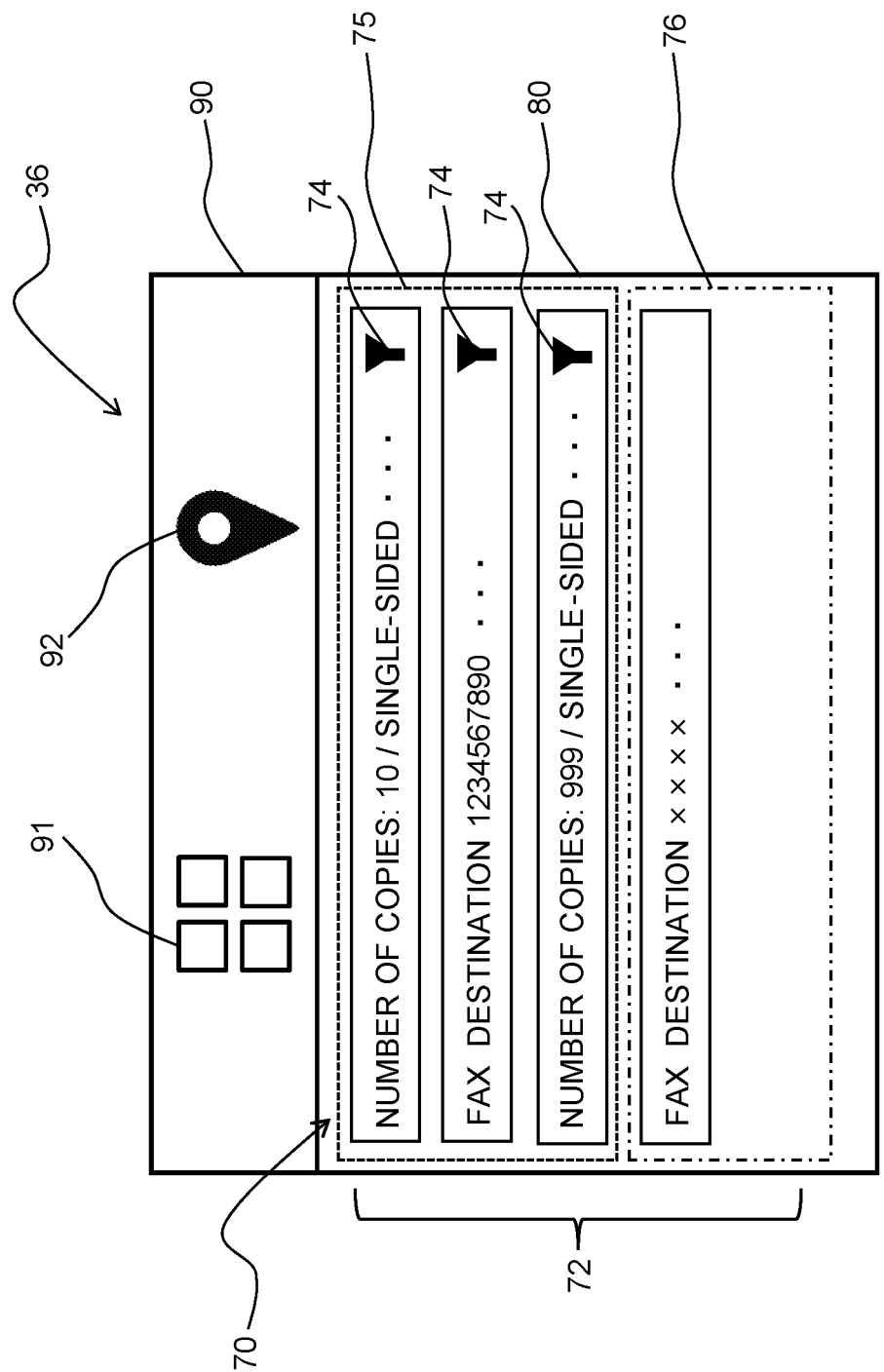

INFORMATION PROCESSING DEVICE AND INFORMATION PROCESSING PROGRAM

TECHNICAL FIELD

The present disclosure relates to an information processing device and an information processing program.

BACKGROUND ART

Japanese Patent Application Laid-Open (JP-A) No. 2018-125687 (Patent Literature 1) describes a technology for preventing a job history that a user wants to view from being hidden in a case in which the job history is displayed in an image processing device.

SUMMARY OF INVENTION

Technical Problem

As an example, a history of jobs that were completed normally and a history of jobs that were not completed normally can be displayed on a screen displaying a history of executed jobs. However, it is desirable to change a display mode on the screen in accordance with a behavior of an executed job in order to enhance the visibility of the screen.

Therefore, an object of the disclosure is to change a display mode of a screen displaying a history of executed jobs in accordance with a behavior of a job that has not been completed normally, the behavior occurring after the execution of the job.

Solution to Problem

An information processing device according to a first aspect includes a processor, in which the processor receive a setting for a job that is an instruction for executing a function, cause an operator associated with the setting for an executed job to be displayable on a history screen displaying a history of the executed jobs, in a case in which an operator displayed on the history screen is operated, apply the received setting for execution of a job corresponding to the operated operator, and change a display mode, on the history screen, of the operator associated with the setting for a job that has not been completed normally in accordance with a behavior of the job that has not been completed normally.

An information processing device according to a second aspect is the information processing device according to the first aspect, in which the processor in a case in which the behavior of the job that has not been completed normally satisfies a predetermined condition, cause the operator corresponding to the job that has not been completed normally to be displayed on the history screen, and in a case in which the behavior of the job that has not been completed normally does not satisfy the predetermined condition, perform control so as not to cause the operator corresponding to the job that has not been completed normally to be displayed on the history screen.

An information processing device according to a third aspect is the information processing device according to the second aspect, in which the processor in a case in which the behavior of the job that has not been completed normally satisfies the predetermined condition, display first confirmation information for confirming whether or not to cause the operator corresponding to the job that has not been completed normally to be displayed on the history screen.

An information processing device according to a fourth aspect is the information processing device according to the second or third aspect, in which the processor in a case in which the behavior of the job that has not been completed normally does not satisfy the predetermined condition, display second confirmation information for confirming whether or not to cause the operator corresponding to the job that has not been completed normally not to be displayed on the history screen.

An information processing device according to a fifth aspect is the information processing device according to any one of the first to fourth aspects, in which the processor receive a pinning setting for distinguishing the operator corresponding to the job that has not been completed normally from other operators in accordance with an instruction from a user in a case in which the behavior of the job that has not been completed normally satisfies the predetermined condition, and in a case in which the behavior of the job that has not been completed normally does not satisfy the predetermined condition, perform control not to perform pinning of the operator corresponding to the job that has not been completed normally.

An information processing device according to a sixth aspect is the information processing device according to the fifth aspect, in which the processor in a case in which the number of operators displayable on the history screen exceeds a prescribed number, delete one or more unpinned operators from the history screen without deleting pinned operators from the history screen.

An information processing device according to a seventh aspect is the information processing device according to any one of the first to sixth aspects, in which a case in which the behavior of the job that has not been completed normally satisfies the predetermined condition is a case in which there is a possibility that the job will be normally completed when the job that has not been completed normally is executed again using a same setting as for the job that was not completed normally.

An information processing device according to an eighth aspect is the information processing device according to any one of the first to seventh aspects, in which a case in which the behavior of the job that has not been completed normally does not satisfy the predetermined condition is a case in which there is no possibility that the job will be normally completed even if the job that has not been completed normally is executed again using a same setting as for the job that has not been completed normally.

An information processing program according to a ninth aspect executable by a computer to perform processing including: receiving a setting for a job that is an instruction for executing a function; causing an operator associated with the setting for an executed job to be displayable on a history screen displaying a history of the executed jobs; in a case in which the operator displayed on the history screen is operated, applying the received setting for execution of a job corresponding to the operated operator; and changing a display mode, on the history screen, of the operator associated with the setting for a job that has not been completed normally in accordance with a behavior of the job that has not been completed normally.

Advantageous Effects of Invention

According to the first aspect, it is possible to change the display mode on the screen displaying the history of executed jobs in accordance with the abnormal behavior of the job occurring after the execution of the job.

According to the second aspect, whether or not to cause the operator corresponding to the job to be displayed on the history screen is determined depending on whether or not the behavior of the job that has not been completed normally satisfies the predetermined condition.

According to the third aspect, it is possible to cause, in a case in which the behavior of the job that has not been completed normally satisfies the predetermined condition, the user to confirm whether or not to cause the operator corresponding to the job to be displayed on the history screen.

According to the fourth aspect, it is possible to cause, in a case in which the behavior of the job that has not been completed normally does not satisfy the predetermined condition, the user to confirm whether or not to cause the operator corresponding to the job not to be displayed on the history screen.

According to the fifth aspect, whether or not the operator corresponding to the job can be pinned is determined depending on whether or not the behavior of the job that has not been completed normally satisfies the predetermined condition.

According to the sixth aspect, an unpinned operator is preferentially deleted as compared with a pinned operator in a case in which the operator is deleted from the history screen.

According to the seventh aspect, it is possible to provide a display mode, on the history screen, of the operator corresponding to a case in which there is a possibility that the behavior of the job is completed normally when the job that has not been completed normally is executed again using a same setting as that when the behavior that was not completed normally.

According to the eighth aspect, it is possible to provide a display mode, on the history screen, of the operator corresponding to a case in which there is no possibility that the behavior of the job is completed normally even if the job that has not been completed normally is executed again using a same setting as that when the behavior that was not completed normally.

According to the ninth aspect, it is possible to change the display mode on the screen displaying the history of executed jobs in accordance with the abnormal behavior of the job occurring after the execution of the job.

BRIEF DESCRIPTION OF DRAWINGS

FIG. 3 shows an example of an execution result determination table.

FIG. 5A shows a second display example displayed on the display unit of the image forming device.

FIG. 11B shows the seventh display example displayed on the display unit of the image forming device.

FIG. 13 shows a ninth display example displayed on the display unit of the image forming device.

FIG. 14 shows a tenth display example displayed on the display unit of the image forming device.

DESCRIPTION OF EMBODIMENTS

Hereinafter, an image forming device 20 as an example of an information processing device according to the present embodiment will be described.

Figure 1:
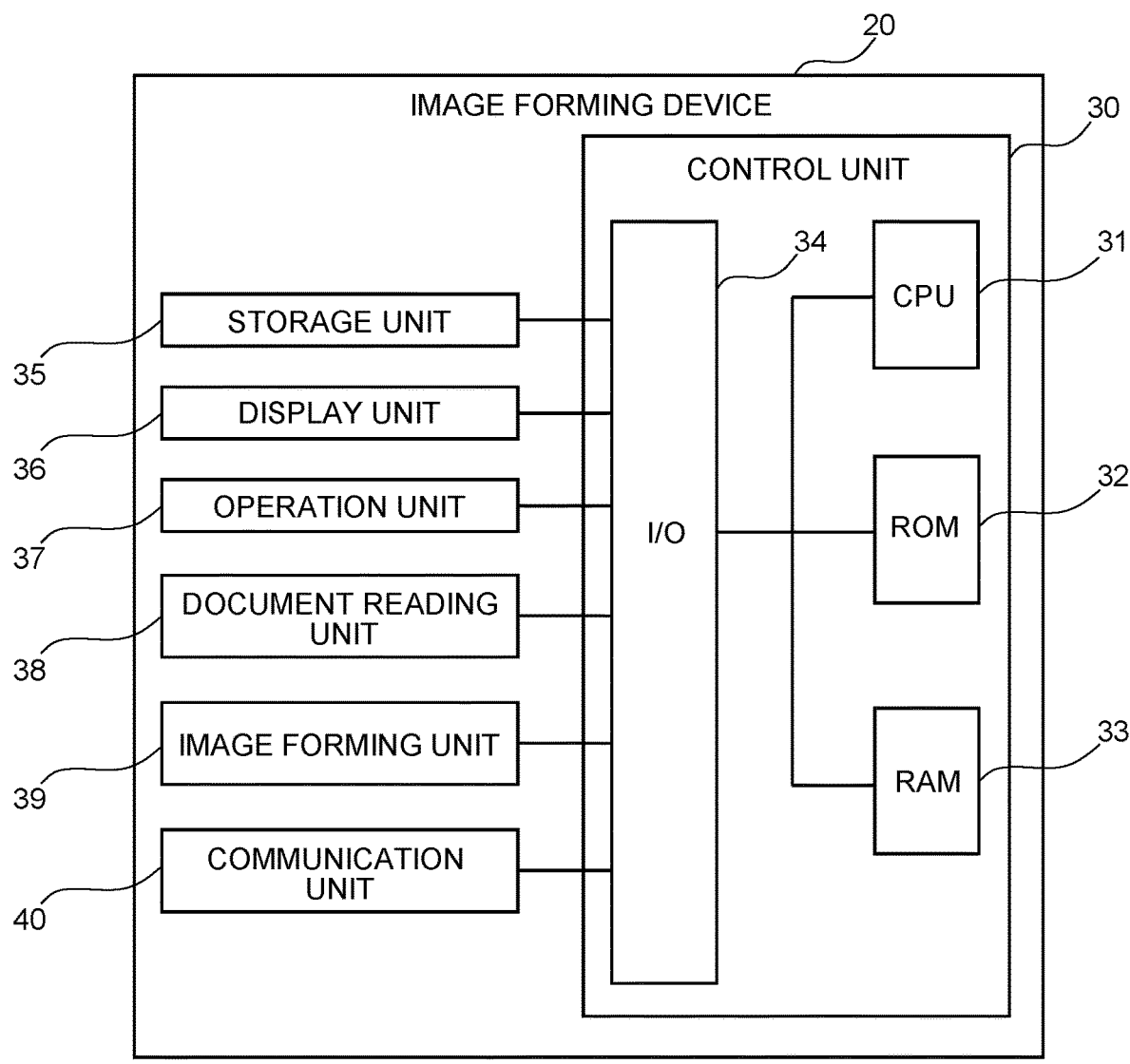
FIG. 1 is a block diagram showing a hardware configuration of an image forming device.

FIG. 1 is a block diagram showing a hardware configuration of the image forming device 20.

As shown in FIG. 1, the image forming device 20 includes a control unit 30 that controls an operation of the image forming device 20. In the control unit 30, a central processing unit (CPU) 31, a read only memory (ROM) 32, a random access memory (RAM) 33, and an input/output interface (I/O) 34 are communicably connected to one another via a bus. The CPU 31 is an example of a "processor".

The CPU 31 is a central processing unit, executes various programs, and controls each unit. That is, the CPU 31 reads a program from the ROM 32 or a storage unit 35 described below and executes the program using the RAM 33 as a work area. The CPU 31 controls each of the components and executes various types of arithmetic processing according to a program recorded in the ROM 32 or the storage unit 35. In the present embodiment, the ROM 32 or the storage unit 35 stores an image forming program as an example of an information processing program for executing at least pinning determination processing and display determination processing described below. The image forming program may be installed in the image forming device 20 in advance, or may be installed in the image forming device 20 by being stored in a nonvolatile storage medium or distributed via a network, if appropriate. Example of the nonvolatile storage medium include a CD-ROM, a magneto-optical disk, a hard disk drive (HDD), a DVD-ROM, a flash memory, and a memory card.

The ROM 32 stores various programs and various data. The RAM 33 functions as a work area and temporarily stores a program or data.

The storage unit 35, a display unit 36, an operation part 37, a document reading unit 38, an image forming unit 39, and a communication unit 40 are connected to the I/O 34. These units can communicate with the CPU 31 via the I/O 34.

The storage unit 35 is implemented by a storage device such as an HDD, a solid state drive (SSD), or a flash memory, and stores various programs and various data.

For example, a liquid crystal display (LCD) or an organic electro luminescence (EL) display is used as the display unit 36. The display unit 36 integrally includes a touch panel.

The operation part 37 is provided with various operation keys such as a numeric keypad and a start key.

The display unit 36 and the operation part 37 receive various instructions from a user of the image forming device 20. Examples of the various instructions include an instruction for starting reading of a document and an instruction for starting copying of a document. The display unit 36 displays various types of information such as a result of processing executed in response to an instruction received from the user and a notification for the processing.

The document reading unit 38 takes in, one by one, documents placed on a feeding tray of an automatic document feeder (not shown) provided at an upper portion of the image forming device 20 and optically reads the taken-in document to obtain image information. Alternatively, the document reading unit 38 optically reads a document placed on a document platen such as a platen glass to obtain image information.

The image forming unit 39 forms, on a recording medium such as paper, an image based on image information obtained by reading performed by the document reading unit 38 or image information obtained from an external personal computer (PC) or the like connected via the network.

The communication unit 40 is an interface for communicating with another device such as a PC. For example, a wired communication standard such as Ethernet (registered trademark) or FDDI, or a wireless communication standard such as 4G, 5G, or Wi-Fi (registered trademark) is used for the communication.

The image forming device 20 executes processing based on the image forming program by using the hardware resources when executing the image forming program.

Figure 2:
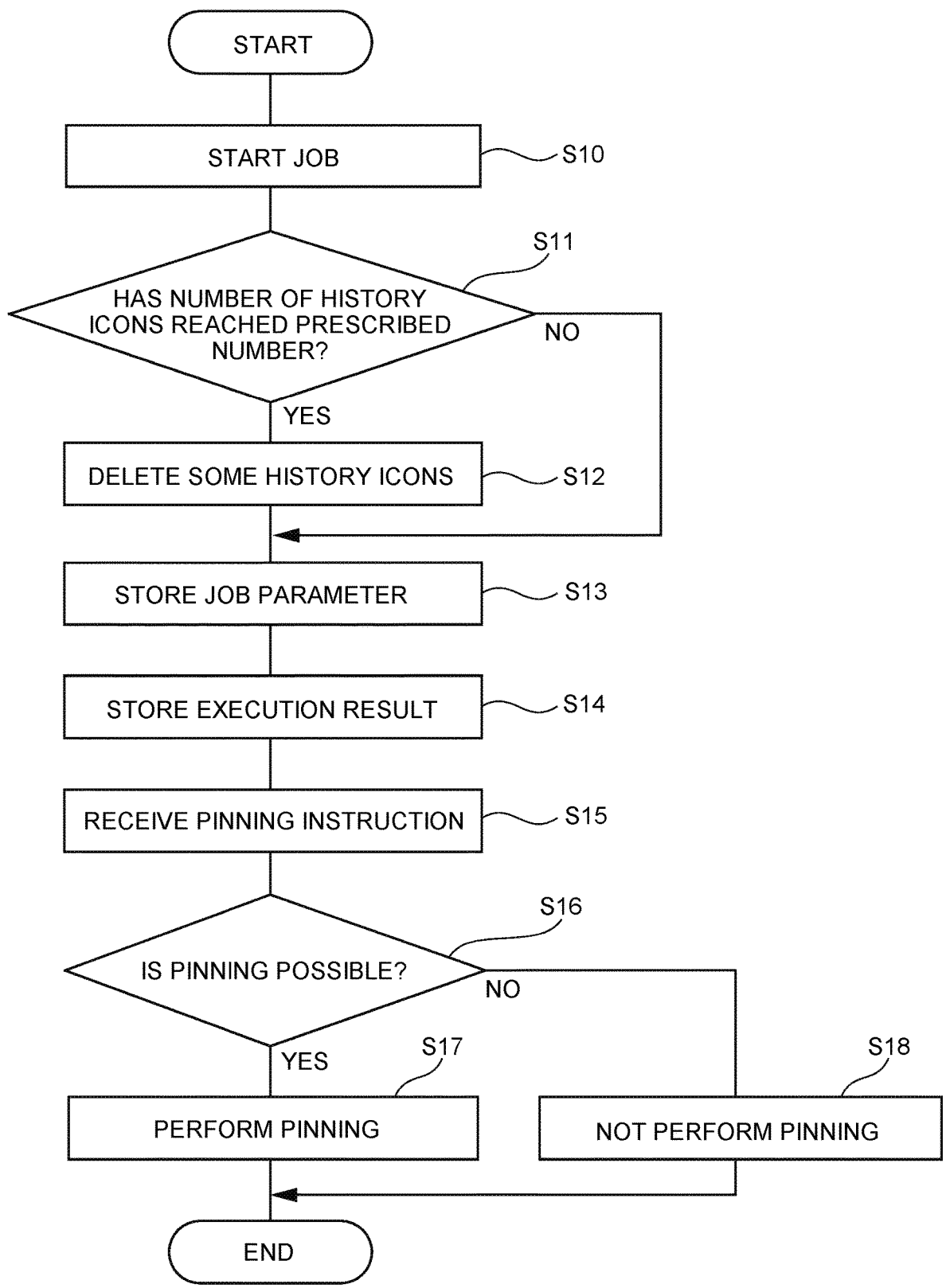
FIG. 2 is a flowchart showing a flow of pinning determination processing executed by the image forming device.

FIG. 2 is a flowchart showing a flow of the pinning determination processing of determining whether or not to perform pinning to distinguish a specific history icon 72 (see FIG. 5) described below displayed on a history screen displaying a history of executed jobs from other history icons 72. The CPU 31 reads the image forming program from the ROM 32 or the storage unit 35, loads the image forming program onto the RAM 33, and executes the image forming program to execute the pinning determination processing. The history icon 72 is an example of an "operator".

In step S10 shown in FIG. 2, the CPU 31 starts a job that is an instruction for executing various functions such as a copying function, a FAX function, a printing function, and a scanning function. Then, the processing proceeds to step S11. In the present embodiment, various functions (for example, the copying function) corresponding to an instruction from the user are executed by starting a job. Hereinafter, the execution of various functions may be described as "executing a job" or the like, which is synonymous with the expression "various functions corresponding to an instruction from the user are executed by starting a job".

In step S11, the CPU 31 determines whether or not the number of history icons 72 displayable on the history screen has reached a prescribed number, and in a case in which it is determined that the number has reached the prescribed number (step S11: YES), the processing proceeds to step S12. On the other hand, in a case in which it is determined by the CPU 31 that the number has not reached the prescribed number (step S11: NO), the processing proceeds to step S13. In the present embodiment, as an example, the prescribed number is "10".

In step S12, the CPU 31 deletes some history icons 72 displayed on the history screen from the history screen. Then, the processing proceeds to step S13. Details thereof will be described below. For example, the CPU 31 deletes one history icon 72 that has not been subjected to pinning described below and has the earliest display timestamp on the history screen.

In step S13, the CPU 31 stores a job parameter for the job started in step S10 in the storage unit 35 as an example. Then, the processing proceeds to step S14. In a case in which a copy job corresponding to the copying function is executed in step S10, examples of the job parameter include the number of copies, a single-sided or double-sided setting, a black-and-white or color setting, or an image quality setting received as a setting for the copy job. The job parameter is an example of a "setting".

In step S14, the CPU 31 stores an execution result of the job started in step S10 in the storage unit 35 as an example. Then, the processing proceeds to step S15. In the present embodiment, as an example, the execution result includes "success" and "failure", and a plurality of behaviors are provided in the execution result of "failure".

In step S15, the CPU 31 receives a pinning setting for the history icon 72 displayed on the history screen. Then, the processing proceeds to step S16. As a premise of step S15, the CPU 31 receives, from the user, an instruction for displaying the history screen (an operation of a drop button 92 (see FIG. 4) described below), and displays the history screen on the display unit 36 in step S15.

In step S16, the CPU 31 determines whether or not the history icon 72 for which the pinning setting has been received can be pinned, and in a case in which it is determined that the history icon 72 can be pinned (step S16: YES), the processing proceeds to step S17. On the other hand, in a case in which it is determined by the CPU 31 that the history icon 72 cannot be pinned (step S16: NO), the processing proceeds to step S18.

Here, the CPU 31 determines whether or not the history icon 72 can be pinned by using an execution result determination table shown in FIG. 3.

FIG. 3 is an example of the execution result determination table.

As shown in FIG. 3, the execution result determination table includes, for each row, an execution result number, the "type" of the execution result corresponding to the associated execution result number, "pinnability", and a "description".

The "execution result number" indicates an identification number that can uniquely identify each of behaviors in a case in which the execution result is "success" and in a case in which the execution result is "failure".

The "type" includes "success" and "failure" as display contents, and indicates the type of the execution result.

The "pinnability" includes "pinnable" and "not pinnable" as display contents. "Pinnable" indicates that pinning is possible, and "not pinnable" indicates that pinning is not possible.

The "description" indicates a description corresponding to "pinnable" or "not pinnable".

In FIG. 3, as an example, in the case of the execution result with the "execution result number" of "001", the "type" is "failure", the "pinnability" is "pinnable", and the "description" is "re-executable by repairing the image forming device", which indicates that the execution result is a failure, but pinning is possible. FIG. 3 shows a part of the execution result determination table, and the execution result determination table also stores execution results with "execution result numbers" other than "001 to 004".

In step S16, the CPU 31 extracts, from the execution result determination table, the execution result number (for example, 002) corresponding to the execution result (for example, a failure caused by incorrect destination) that is pinnability determination target. Then, the CPU 31 determines that pinning is possible in a case in which the pinnability corresponding to the extracted execution result number is "pinnable", and determines that pinning is not possible in a case in which the pinnability corresponding to the extracted execution result number is "not pinnable".

Returning to FIG. 2, in step S17, the CPU 31 performs pinning on the history icon 72 for which the pinning setting has been received in step S15. Then, the processing ends.

In step S18, the CPU 31 does not perform pinning on the history icon 72 for which the pinning setting has been received in step S15. Then, the processing ends.

Next, a display example displayed on the display unit 36 of the image forming device 20 will be described.

Figure 4A:
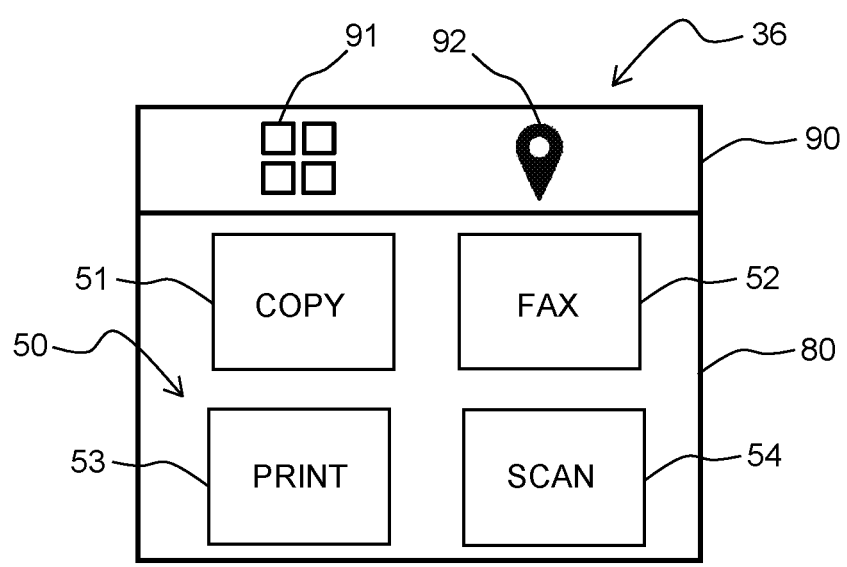
FIG. 4A shows a first display example displayed on a display unit of the image forming device.
Figure 4B:
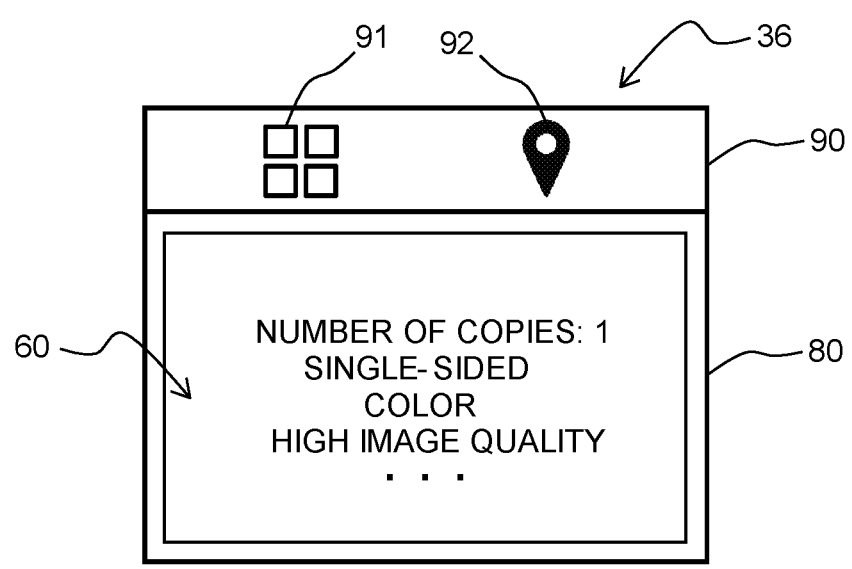
FIG. 4B shows the first display example displayed on the display unit of the image forming device.
Figure 4C:
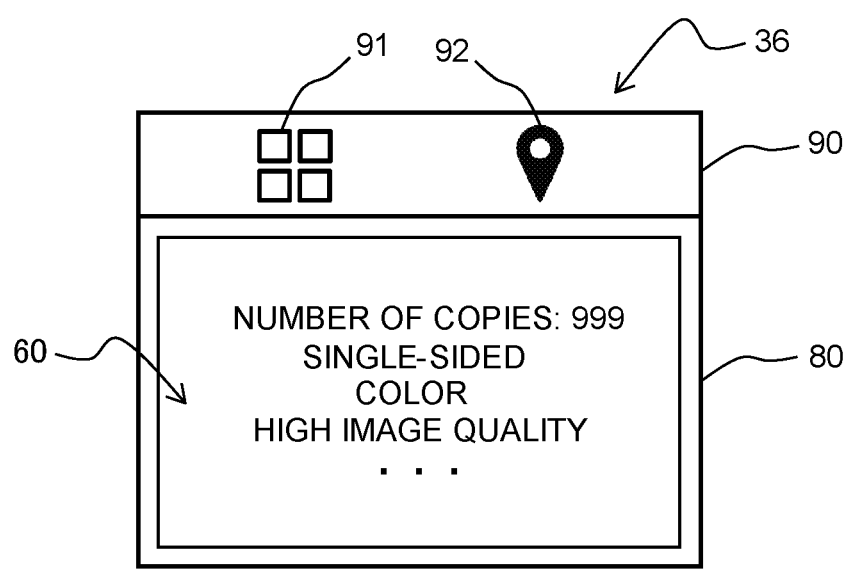
FIG. 4C shows the first display example displayed on the display unit of the image forming device.

FIG. 4 shows a first display example displayed on the display unit 36 of the image forming device 20. As shown in FIGS. 4A to 4C, the display unit 36 is divided into a first display unit 80 on which a home screen 50 and a setting screen 60 described below are displayed, and a second display unit 90 that is positioned on the upper side of the first display unit 80, has a smaller display region than the first display unit 80, and displays a home button 91 and the drop button 92. The home button 91 is a button operated by the user to change a display content of the first display unit 80 to the home screen 50. The drop button 92 is a button operated by the user to change the display content of the first display unit 80 to a history screen 70 described below. Similarly to the first display example shown in FIG. 4, the display unit 36 is divided into the first display unit 80 and the second display unit 90 also in and after a second display example displayed on the display unit 36, which will be described with reference to FIG. 5 and subsequent drawings.

The first display unit 80 shown in FIG. 4A displays the home screen 50 showing various functions of the image forming device 20. The home screen 50 displays, as various functions, a copy button 51 for executing a copy job corresponding to the copying function, a FAX button 52 for executing a FAX job corresponding to the FAX function, a print button 53 for executing a printing job corresponding to the printing function, and a scan button 54 for executing a scanning job corresponding to the scanning function.

A first display example of the setting screen 60 showing job parameters for each job is displayed on the first display unit 80 shown in FIG. 4B. The CPU 31 displays the setting screen 60 in a case in which any one of the copy button 51, the FAX button 52, the print button 53, or the scan button 54 displayed on the home screen 50 is operated.

As an example, FIG. 4B shows the setting screen 60 in a case in which the copy button 51 is operated, and initial job parameters for the copy job are displayed. In the present embodiment, as shown in FIG. 4B, the initial job parameters for the copy job are set to "number of copies: 1", "single-sided", "color", "high image quality", and the like.

A second display example of the setting screen 60 is displayed on the first display unit 80 shown in FIG. 4C. The setting screen 60 shown in FIG. 4C shows a state in which "number of copies: 1" of the setting screen 60 shown in FIG. 4B is changed to "number of copies: 999" in accordance with an instruction from the user. As an example, the CPU 31 sets a numerical value corresponding to an operation performed by the user on the operation part 37 as "number of copies".

FIG. 5 shows a second display example displayed on the display unit 36 of the image forming device 20.

A first display example of the history screen 70 showing a history of executed jobs is displayed on the first display unit 80 shown in FIG. 5A. As an example, the CPU 31 displays the history screen 70 in a case in which the drop button 92 displayed on the second display unit 90 is operated. A history icon 72 in which the job parameters for each job are displayed is displayed as a history of executed jobs on the history screen 70. In FIG. 5A, three history icons 72 are displayed, but an upper limit of the number of history icons 72 that can be displayed on the history screen 70 is "10". Therefore, in a case in which there are four or more executed jobs, another history icon 72 can be viewed by scrolling the history screen 70 up and down. At this time, when the history icons 72 are displayed on the history screen 70, the CPU 31 basically displays the history icon 72 corresponding to the latest job at the uppermost portion of the history screen 70, and moves the other already displayed history icons 72 downward one by one.

Figure 5B:
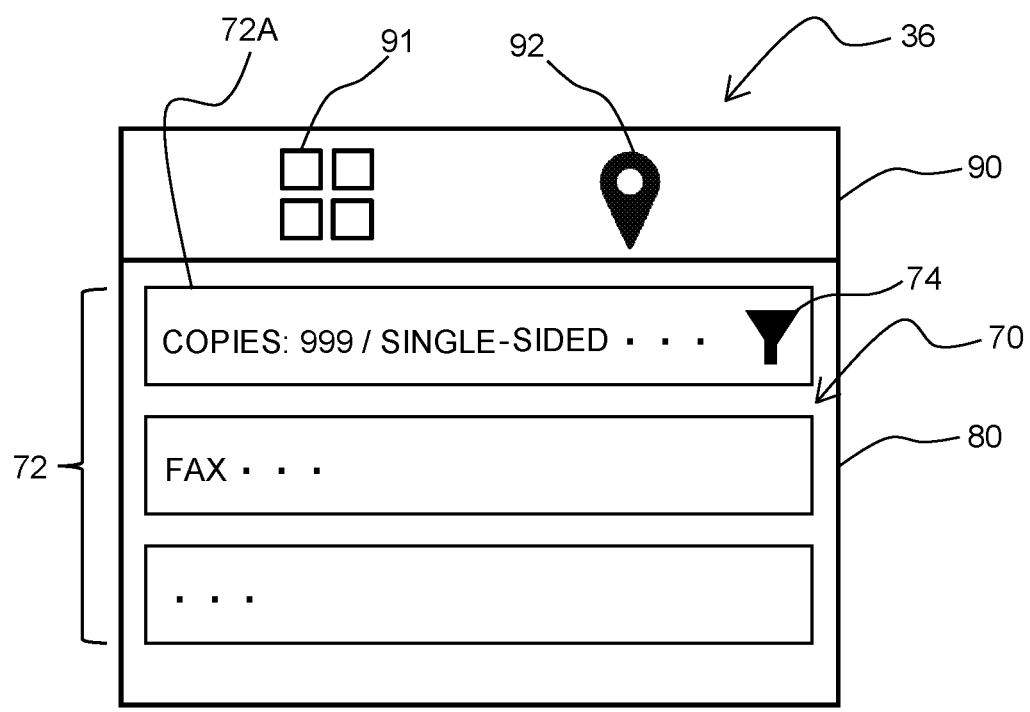
FIG. 5B shows the second display example displayed on the display unit of the image forming device.

A second display example of the history screen 70 is displayed on the first display unit 80 shown in FIG. 5B. As an example, FIG. 5B shows the history screen 70 in a case in which pinning is performed on a history icon 72A displayed at the uppermost portion of the history screen 70. As shown in FIG. 5B, a pinning mark 74 indicating that pinning has been performed is displayed at the right end in the frame of the history icon 72A for which the pinning has been performed. As an example, the CPU 31 displays the pinning mark 74 in a case in which any one of the history icons 72 displayed on the history screen 70 is operated after a predetermined operation (hereinafter, referred to as "specific operation") for the operation part 37, and the operated history icon 72 can be pinned. In the present embodiment, the history icon 72 in which the pinning mark 74 is displayed and for which the pinning has been performed is not deleted from the history screen 70, and is fixedly displayed at the position where the pinning is performed. Therefore, in a case in which there is a history icon 72 in which the pinning mark 74 is displayed, when the history icon 72 corresponding to a newly executed job is displayed on the history screen 70, the CPU 31 displays the history icon 72 corresponding to the job under the history icon 72 in which the pinning mark 74 is displayed as an exception described above.

FIG. 6 is a third display example displayed on the display unit 36 of the image forming device 20.

Figure 6A:
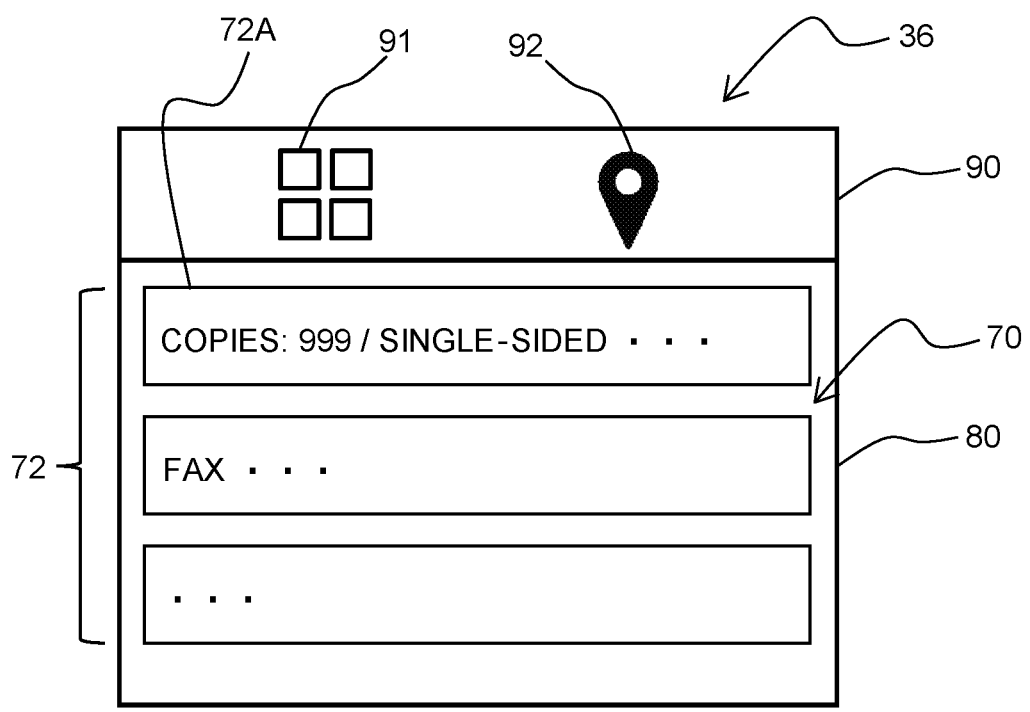
FIG. 6A shows a third display example displayed on the display unit of the image forming device.

The history screen 70 having the same contents as those of FIG. 5A is displayed on the first display unit 80 shown in FIG. 6A.

Figure 6B:
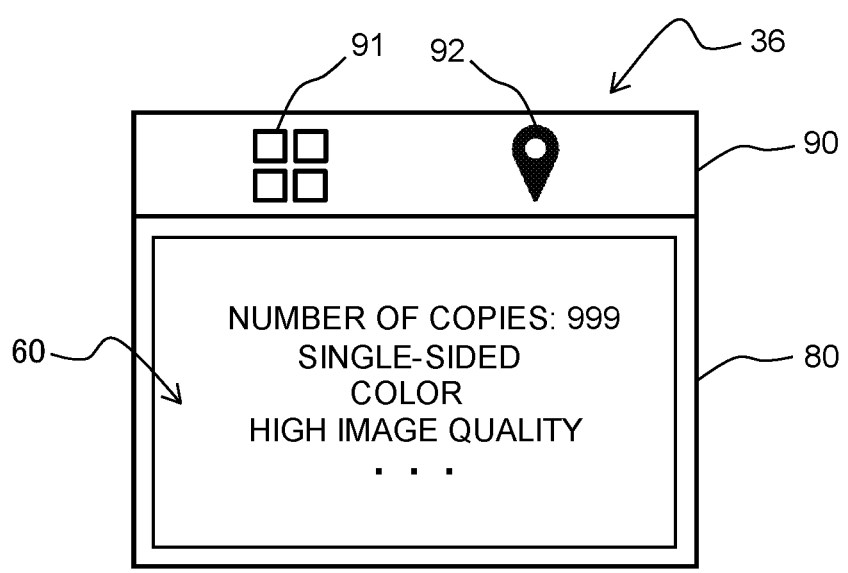
FIG. 6B shows the third display example displayed on the display unit of the image forming device.

The first display unit 80 shown in FIG. 6B displays the setting screen 60 having the same contents as those in FIG. 4C. As an example, the CPU 31 displays the setting screen 60 shown in FIG. 6B when the history icon 72A shown in FIG. 6A is operated without performing the specific operation. As described above, in a case in which any one of the history icons 72 displayed on the history screen 70 is operated without performing the specific operation, the CPU 31 applies a received job parameter for execution of the job corresponding to the operated history icon 72. In the present embodiment, in a case in which the CPU 31 applies the job parameter, the content of the applied job parameter is displayed on the setting screen 60.

FIG. 7 is a fourth display example displayed on the display unit 36 of the image forming device 20.

Figure 7A:
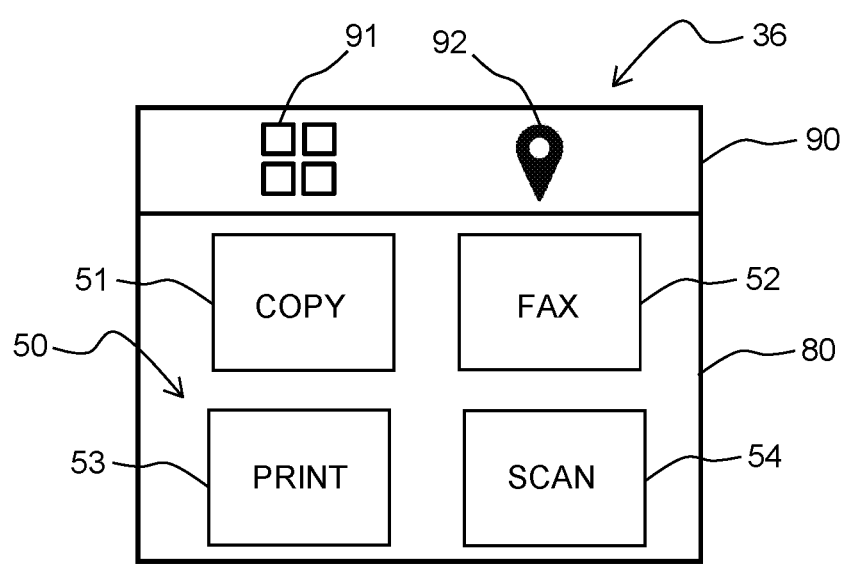
FIG. 7A shows a fourth display example displayed on the display unit of the image forming device.

The first display unit 80 shown in FIG. 7A displays the home screen 50 having the same contents as those in FIG. 4A.

Figure 7B:
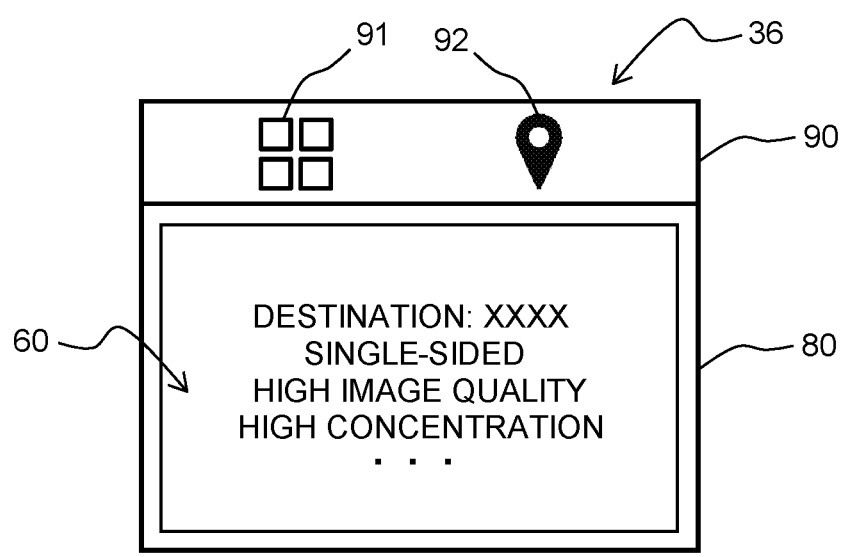
FIG. 7B shows the fourth display example displayed on the display unit of the image forming device.

A third display example of the setting screen 60 is displayed on the first display unit 80 shown in FIG. 7B. As an example, FIG. 7B shows the setting screen 60 in a case in which the FAX button 52 is operated, and job parameters for the FAX job are displayed. Then, as shown in FIG. 7B, the job parameters for the FAX job are set to "to: xxxx", "single-sided", "high image quality", "high concentration", and the like. As an example, the CPU 31 sets a FAX setting corresponding to an operation performed by the user on the operation part 37 as the job parameter for the FAX job.

Figure 7C:
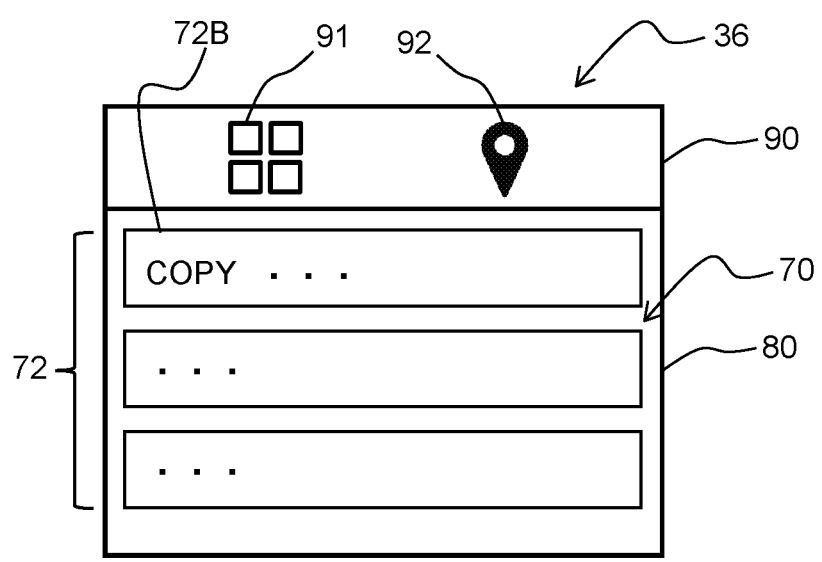
FIG. 7C shows the fourth display example displayed on the display unit of the image forming device.

A third display example of the history screen 70 is displayed on the first display unit 80 shown in FIG. 7C. FIG. 7C shows the history screen 70 after an execution result of "failure" of the FAX job executed using the job parameters of FIG. 7B is obtained. Specifically, FIG. 7C shows the history screen 70 after the execution result of "failure" is obtained because transmission from the image forming device 20 to a counterpart machine that is a FAX destination has not performed due to an incorrect destination "destination: xxxx" in the job parameters of FIG. 7B. At this time, the history icon 72 corresponding to the FAX job executed using the job parameters of FIG. 7B is not displayed on the history screen 70 shown in FIG. 7C.

Here, in the present embodiment, the CPU 31 can receive a job parameter for a job that is an instruction for executing various functions and causes the history icon 72 associated with the job parameter for an executed job to be displayable on the history screen 70 (see FIGS. 5, 6A, and 7C). In a case in which any one of the history icons 72 displayed on the history screen 70 is operated without performing the specific operation, the CPU 31 applies a received job parameter for execution of the job corresponding to the operated history icon 72 (see FIG. 6). In addition, the CPU 31 changes a display mode, on the history screen 70, of the history icon 72 associated with a job parameter for a job that has not been completed normally, that is, a job whose execution result is "failure", in accordance with a behavior of the job whose execution result is "failure".

"Changing the display mode, on the history screen 70, of the history icon 72" described above includes displaying the history icon 72 on the history screen 70, not displaying the history icon 72 on the history screen 70, and displaying a display content corresponding to each history icon 72 when displaying the history icon 72 on the history screen 70.

In addition, in the case of "applying the job parameter", the content of the applied job parameter may be displayed as shown in FIG. 6B, or the job corresponding to the history icon 72 operated on the history screen 70 may be executed using the applied job parameter without displaying the content of the applied job parameter.

With the above configuration, according to the present embodiment, the display mode of the history screen 70 can be changed in accordance with a behavior of a job whose execution result is "failure".

As an example of "changing the display mode on the history screen 70" described above, in a case in which the behavior of the job whose execution result is "failure" satisfies a predetermined condition, the CPU 31 causes the history icon 72 corresponding to the job whose execution result is "failure" to be displayed on the history screen 70 (see FIGS. 4 and 5). On the other hand, in a case in which the behavior of the job whose execution result is "failure" does not satisfy the predetermined condition, the CPU 31 performs control so as not to cause the history icon 72 corresponding to the job whose execution result is "failure" to be displayed on the history screen 70 (see FIG. 7).

With the above configuration, according to the present embodiment, whether or not to cause the history icon 72 corresponding to the job to be displayed on the history screen 70 is determined depending on whether or not the behavior of the job whose execution result is "failure" satisfies the predetermined condition.

Figure 8:
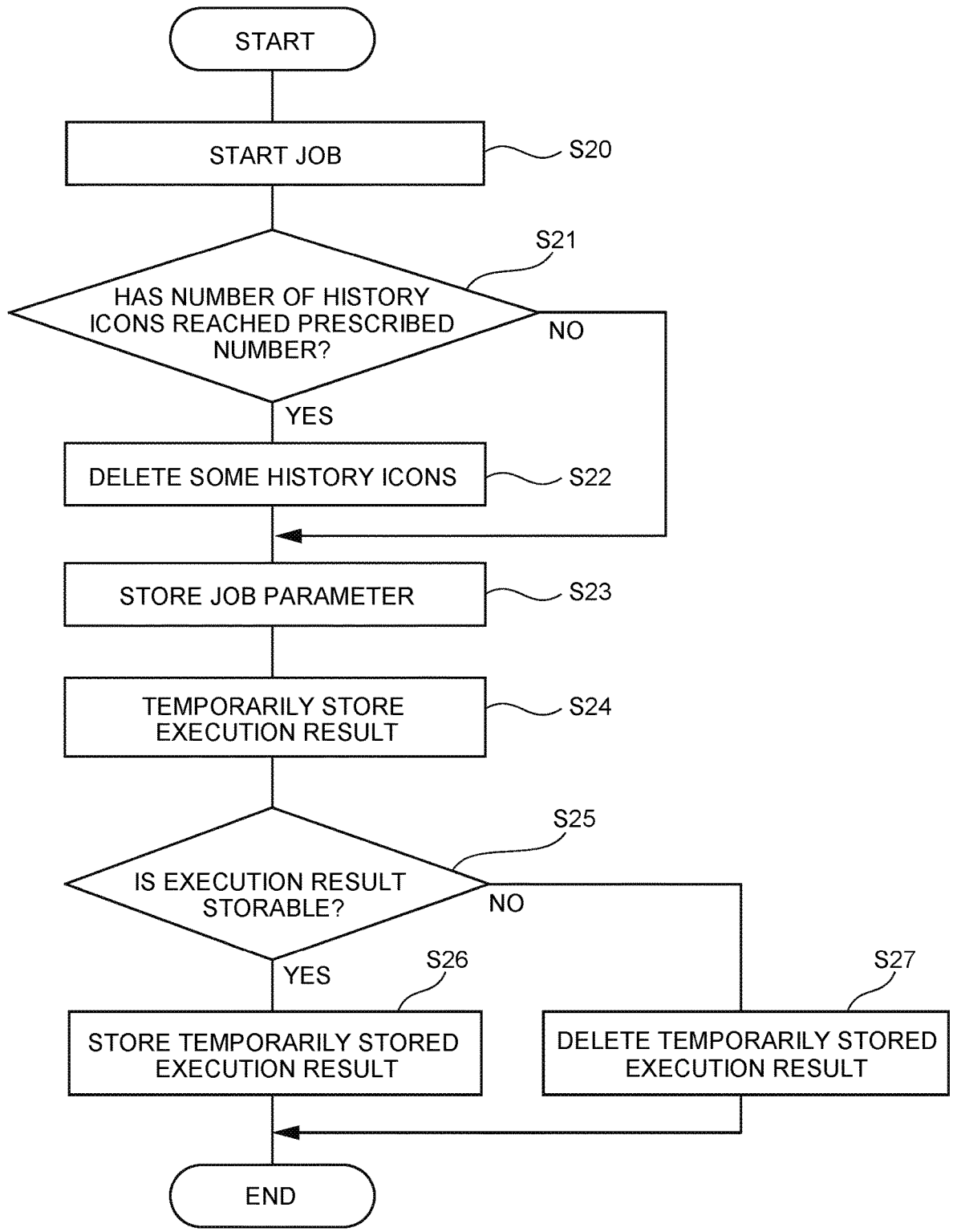
FIG. 8 is a flowchart showing a flow of display determination processing executed by the image forming device.

Here, the CPU 31 determines whether or not to cause the history icon 72 corresponding to the job to be displayed on the history screen 70 by performing the display determination processing shown in FIG. 8.

FIG. 8 is a flowchart showing a flow of the display determination processing of determining whether or not to cause the history icon 72 corresponding to an executed job to be displayed on the history screen 70. The CPU 31 reads the image forming program from the ROM 32 or the storage unit 35, loads the image forming program onto the RAM 33, and executes the image forming program to execute the display determination processing.

In step S20 shown in FIG. 8, the CPU 31 starts a job. Then, the processing proceeds to step S21.

In step S21, the CPU 31 determines whether or not the number of history icons 72 displayable on the history screen 70 has reached a prescribed number, and in a case in which it is determined that the number has reached the prescribed number (step S21: YES), the processing proceeds to step S22. On the other hand, in a case in which it is determined by the CPU 31 that the number has not reached the prescribed number (step S21: NO), the processing proceeds to step S23.

In step S22, the CPU 31 deletes some history icons 72 displayed on the history screen 70 from the history screen 70. Then, the processing proceeds to step S23.

In step S23, the CPU 31 stores a job parameter for the job started in step S20 in the storage unit 35 as an example. Then, the processing proceeds to step S24.

In step S24, the CPU 31 temporarily stores the execution result of the job started in step S20 as an example in a storage region of the storage unit 35 different from a storage region in which the job parameter is stored in step S23. Then, the processing proceeds to step S25.

In step S25, the CPU 31 determines whether or not the execution result temporarily stored in step S24 can be stored, and in a case in which it is determined that the execution result can be stored (step S25: YES), the processing proceeds to step S26. On the other hand, in a case in which it is determined by the CPU 31 that the execution result cannot be stored (step S25: NO), the processing proceeds to step S27. Here, the CPU 31 determines that the execution result can be stored in a case in which the execution result is "success" or in a case in which the behavior of the job whose execution result is "failure" satisfies the predetermined condition. In addition, in a case in which the behavior of the job whose execution result is "failure" does not satisfy the predetermined condition, the CPU 31 determines that the execution result cannot be stored.

In step S26, as an example, the CPU 31 moves the execution result temporarily stored in step S24 to the same storage region as the storage region in which the job parameter is stored in step S23, and stores the execution result in such a way as not to be deleted. Then, the processing ends. As a result, the history icon 72 corresponding to the job for which the execution result is temporarily stored in step S24 is displayed on the history screen 70.

In step S27, the CPU 31 deletes the execution result temporarily stored in step S24. Then, the processing ends. As a result, the history icon 72 corresponding to the job the execution result temporarily stored in step S24 is not displayed on the history screen 70.

In the present embodiment, a case in which the behavior of the job whose execution result is "failure" satisfies the predetermined condition is a case in which there is a possibility that the execution result of the job becomes "success" when the job whose execution result is "failure" is executed again using the same job parameter as that when the execution result is "failure". Examples of a case in which the above predetermined condition is satisfied include a case in which the execution result is "failure" due to occurrence of at least one of a shortage of consumables used in the image forming device 20, a failure of a component included in the image forming device 20, end of life of a component included in the image forming device 20, timeout during transmission of a FAX of the image forming device 20, a busy condition of the counterpart machine as a destination of a FAX from the image forming device 20, a connection failure of a communication line between the image forming device 20 and a counterpart machine, or a connection failure of a telephone line between the image forming device 20 and the counterpart machine, as the behavior of the job.

With the above configuration, according to the present embodiment, it is possible to provide a display mode, on the history screen 70, of the history icon 72 corresponding to a case in which there is a possibility that the execution result of the job becomes "success" when the job whose execution result is "failure" is executed again using the same job parameter as that when the execution result is "failure".

In the present embodiment, a case in which the behavior of the job whose execution result is "failure" does not satisfy the predetermined condition is a case in which there is no possibility that the execution result of the job becomes "success" even if the job whose execution result is "failure" is executed again using the same job parameter as that when the execution result is "failure". Examples of to a case in which the predetermined condition is not satisfied as described above include a case in which the execution result is "failure" due to occurrence of at least one of incorrectness of a destination (that is, an incorrect destination) designated in the image forming device 20 or rejection of reception of information by the counterpart machine as the destination from the image forming device 20 as the behavior of the job.

Examples of the incorrect destination described above include a case in which a prohibited domain is designated as a destination, and a case in which illegal character designation such as input of an alphabetic character to a portion for inputting a number is performed, in addition to a wrong destination for an e-mail or a FAX. Examples of a case in which the counterpart machine refuses to receive information include a case in which the image forming device 20 performs confidential transmission but the counterpart machine does not have confidential reception capability, a case in which the counterpart machine does not have a confidential box designated by the image forming device 20, a case in which a line is designated by a FAX job but the counterpart machine does not have the line, and a case in which a machine password designated by the image forming device 20 is different from a machine password set for the counterpart machine.

With the above configuration, according to the present embodiment, it is possible to provide a display mode, on the history screen 70, of the history icon 72 corresponding to a case in which there is no possibility that the execution result of the job becomes "success" even if the job whose execution result is "failure" is executed again using the same job parameter as that when the execution result is "failure".

Here, in the present embodiment, in a case in which the behavior of the job whose execution result is "failure" satisfies the predetermined condition, the CPU 31 displays first confirmation information 86 (see FIG. 9C) for confirming whether or not to cause the history icon 72 corresponding to the job whose execution result is "failure" to be displayed on the history screen 70.

FIG. 9 is a fifth display example displayed on the display unit 36 of the image forming device 20.

Figure 9A:
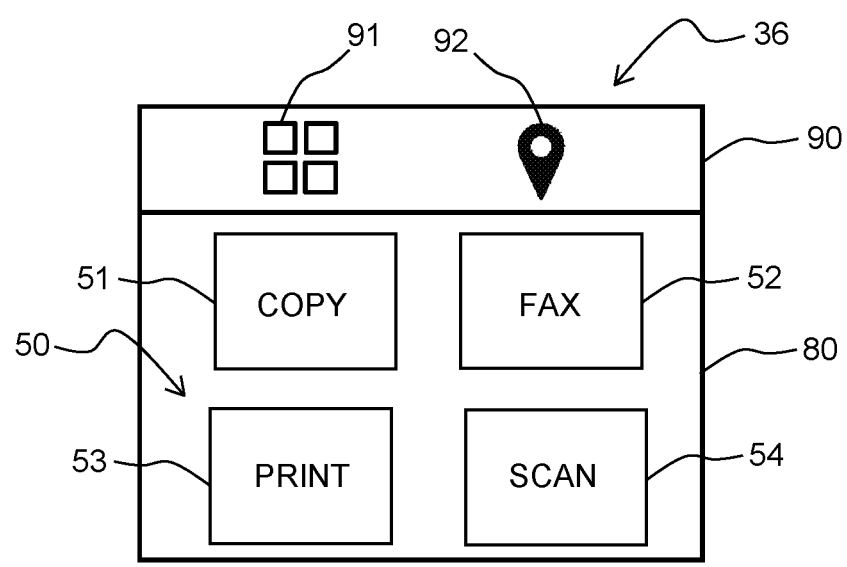
FIG. 9A shows a fifth display example displayed on the display unit of the image forming device.

The first display unit 80 shown in FIG. 9A displays the home screen 50 having the same contents as those in FIG. 4A.

Figure 9B:
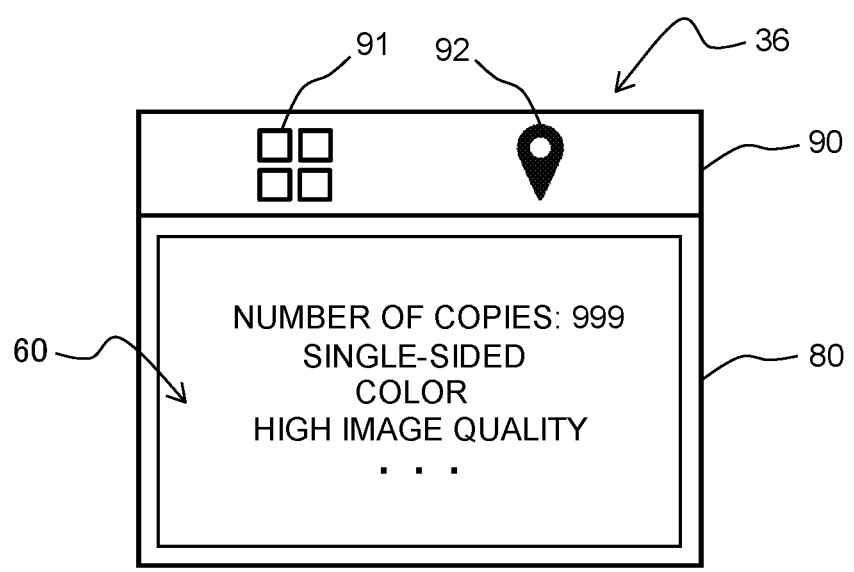
FIG. 9B shows the fifth display example displayed on the display unit of the image forming device.

The first display unit 80 shown in FIG. 9B displays the setting screen 60 having the same contents as those in FIG. 4C.

Figure 9C:
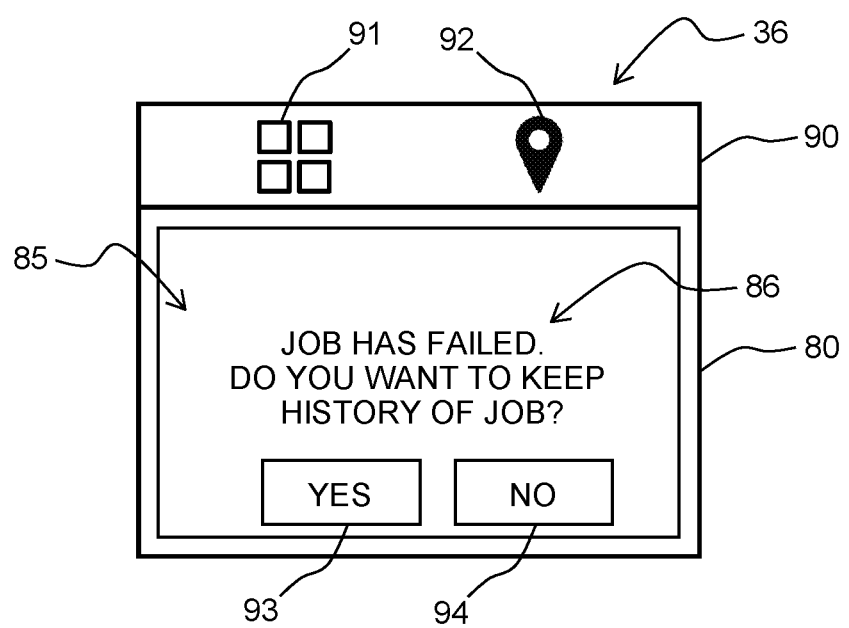
FIG. 9C shows the fifth display example displayed on the display unit of the image forming device.

A first display example of a confirmation screen 85 for causing the user to confirm information is displayed on the first display unit 80 shown in FIG. 9C. As an example, the CPU 31 displays the confirmation screen 85 shown in FIG. 9C in a case in which the copy job executed to print "999 copies" based on the job parameter of FIG. 9B is stopped due to runout of paper, and the execution result is "failure" because the copy job is stopped without replenishing paper.

The confirmation screen 85 shown in FIG. 9C displays the first confirmation information 86, a Yes button 93, and a No button 94.

The first confirmation information 86 indicates a message to the user. As an example, a message "The job has failed. Do you want to keep the history of the job?" is displayed as the first confirmation information 86 in FIG. 9C. Then, in a case in which the Yes button 93 is operated while the confirmation screen 85 shown in FIG. 9C is displayed, the CPU 31 performs control to cause the history icon 72 corresponding to the job to be displayed on the history screen 70. On the other hand, in a case in which the No button 94 is operated while the confirmation screen 85 shown in FIG. 9C is displayed, the CPU 31 performs control so as not to cause the history icon 72 corresponding to the job to be displayed on the history screen 70.

With the above configuration, according to the present embodiment, in a case in which the behavior of the job whose execution result is "failure" satisfies the predetermined condition, the user can be caused to confirm whether or not to cause the history icon 72 corresponding to the job to be displayed on the history screen 70.

Further, in the present embodiment, in a case in which the behavior of the job whose execution result is "failure" does not satisfy the predetermined condition, second confirmation information 87 (see FIG. 10C) for confirming whether or not to cause the history icon 72 corresponding to the job whose execution result is "failure" not to be displayed on the history screen 70 is displayed.

FIG. 10 is a sixth display example displayed on the display unit 36 of the image forming device 20.

Figure 10A:
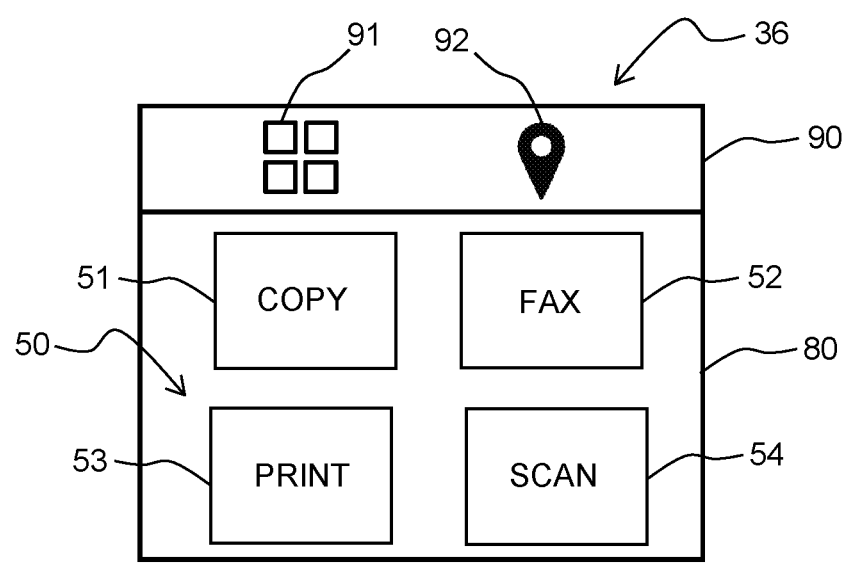
FIG. 10A shows a sixth display example displayed on the display unit of the image forming device.

The first display unit 80 shown in FIG. 10A displays the home screen 50 having the same contents as those in FIG. 4A.

Figure 10B:
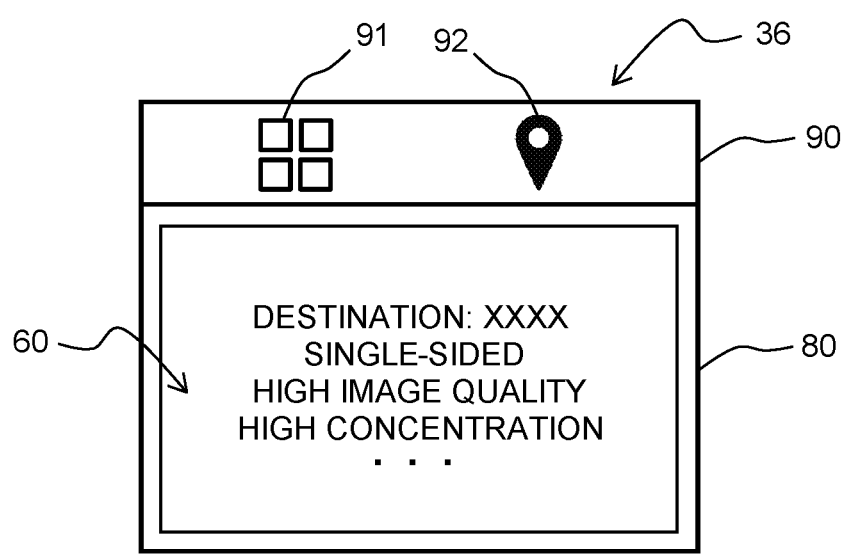
FIG. 10B shows the sixth display example displayed on the display unit of the image forming device.

The first display unit 80 shown in FIG. 10B displays the setting screen 60 having the same contents as those in FIG. 7B.

Figure 10C:
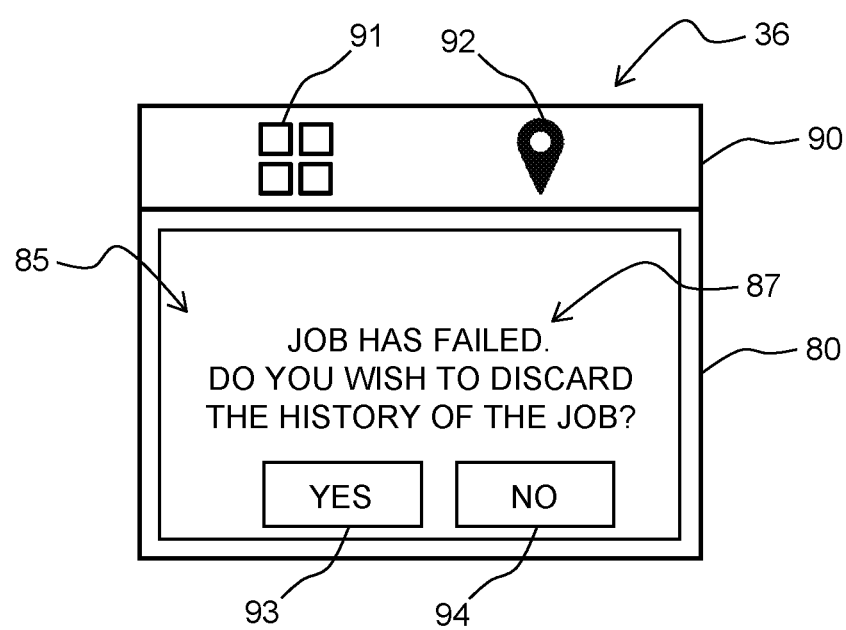
FIG. 10C shows the sixth display example displayed on the display unit of the image forming device.

A second display example of the confirmation screen 85 is displayed on the first display unit 80 shown in FIG. 10C. As an example, the CPU 31 displays the confirmation screen 85 shown in FIG. 10C in a case in which transmission to the counterpart machine has not performed due to an incorrect destination "destination: xxxx" based on the job parameters of FIG. 10B, and the execution result is "failure".

The confirmation screen 85 shown in FIG. 10C displays the second confirmation information 87, the Yes button 93, and the No button 94.

The second confirmation information 87 indicates a message to the user. As an example, a message, "The job has failed. Do you wish to discard the history of the job?", is displayed as the second confirmation information 87 in FIG. 10C. Then, in a case in which the YES button 93 is operated while the confirmation screen 85 shown in FIG. 10C is displayed, the CPU 31 performs control to cause the history icon 72 corresponding to the job not to be displayed on the history screen 70. On the other hand, in a case in which the NO button 94 is operated while the confirmation screen 85 shown in FIG. 10C is displayed, the CPU 31 performs control to cause the history icon 72 corresponding to the job to be displayed on the history screen 70.

With the above configuration, according to the present embodiment, in a case in which the behavior of the job whose execution result is "failure" does not satisfy the predetermined condition, the user can be caused to confirm whether or not to cause the history icon 72 corresponding to the job not to be displayed on the history screen 70.

Here, in the present embodiment, as described above with reference to FIG. 5, in a case in which the behavior of the job whose execution result is "failure" satisfies the predetermined condition, the CPU 31 receives the pinning setting for distinguishing the history icon 72 corresponding to the job whose execution result is "failure" from the other history icons 72 in accordance with an instruction from the user.

On the other hand, in the present embodiment, in a case in which the behavior of the job whose execution result is "failure" does not satisfy the predetermined condition, the CPU 31 performs control in such a way that the history icon 72 corresponding to the job whose execution result is "failure" cannot be pinned.

FIG. 11 is a seventh display example displayed on the display unit 36 of the image forming device 20.

Figure 11A:
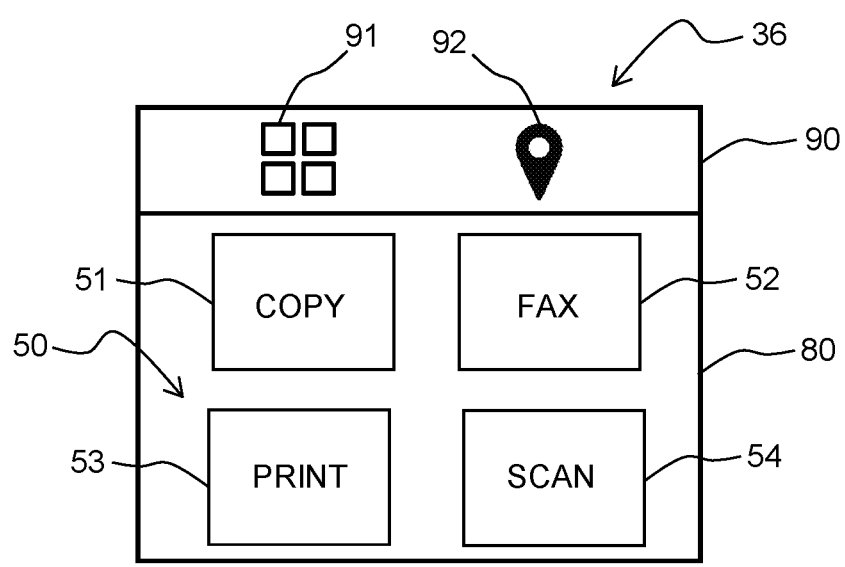
FIG. 11A shows a seventh display example displayed on the display unit of the image forming device.

The first display unit 80 shown in FIG. 11A displays the home screen 50 having the same contents as those in FIG. 4A.

The first display unit 80 shown in FIG. 11B displays the setting screen 60 having the same contents as those in FIG. 7B.

Figure 11C:
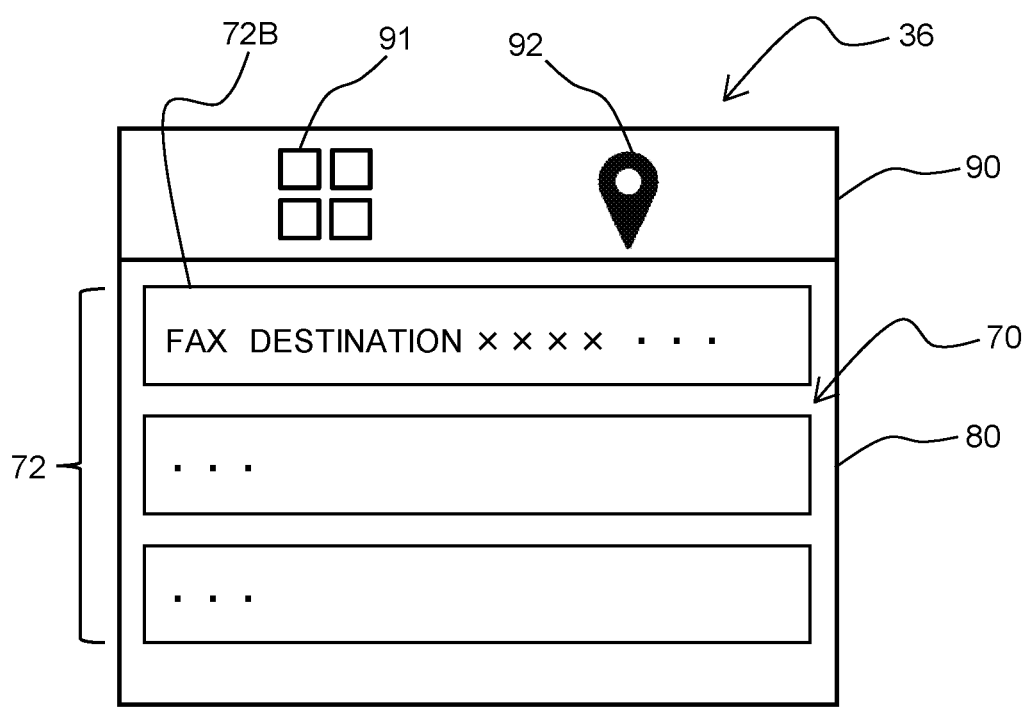
FIG. 11C shows the seventh display example displayed on the display unit of the image forming device.

A fourth display example of the history screen 70 is displayed on the first display unit 80 shown in FIG. 11C. FIG. 11C shows the history screen 70 after an execution result of "failure" of the FAX job executed using the job parameters of FIG. 11B is obtained. Specifically, FIG. 11C shows the history screen 70 after the execution result of "failure" is obtained because transmission to the counterpart machine has not performed due to an incorrect destination "destination: xxxx" based on the job parameters of FIG. 11B. At this time, the history icon 72 corresponding to the FAX job executed using the job parameters of FIG. 11B is displayed as a history icon 72B at the uppermost portion of the history screen 70 shown in FIG. 11C. However, the CPU 31 does not display the pinning mark 74 on the history icon 72B even when the history icon 72B is operated after the specific operation because the operated history icon 72B cannot be pinned. In a case in which there is no possibility that the execution result becomes "success" even if the job is executed again using the job parameter of the job like the job corresponding to the history icon 72B, the CPU 31 may perform control in such a way that the job is not executed again even when the history icon 72B is operated without the specific operation.

With the above configuration, according to the present embodiment, whether or not the history icon 72 corresponding to the job can be pinned is determined depending on whether or not the behavior of the job whose execution result is "failure" satisfies the predetermined condition.

Here, in the present embodiment, in a case in which the number of history icons 72 displayable on the history screen 70 exceeds the prescribed number, the CPU 31 does not delete a pinned history icon 72 from the history screen 70, but deletes some unpinned history icons 72 from the history screen 70.

A case in which a job is executed and a history of the job is kept in a situation in which the prescribed number is "10", the number of already executed jobs is 10, and ten history icons 72 are displayed will be described with reference to FIG. 5B.

In the above case, the CPU 31 does not delete the pinned history icon 72A from the history screen 70, but deletes one unpinned history icon 72 having the earliest display timestamp and displayed on the history screen 70. Therefore, even after some history icons 72 are deleted from the history screen 70, the history icon 72A is continuously displayed at the uppermost portion of the history screen 70 without being changed.

With the above configuration, according to the present embodiment, in a case in which the history icon 72A is deleted from the history screen 70, an unpinned history icon 72A is deleted with priority over a pinned history icon 72A.

(Others)

In a case in which the pinning setting is received and the pinning cannot be performed due to a problem of a received job parameter for execution of the job, the CPU 31 may display caution information 88 (see FIG. 12A) for enabling pinning on the display unit 36.

FIG. 12 is an eighth display example displayed on the display unit 36 of the image forming device 20.

Figure 12A:
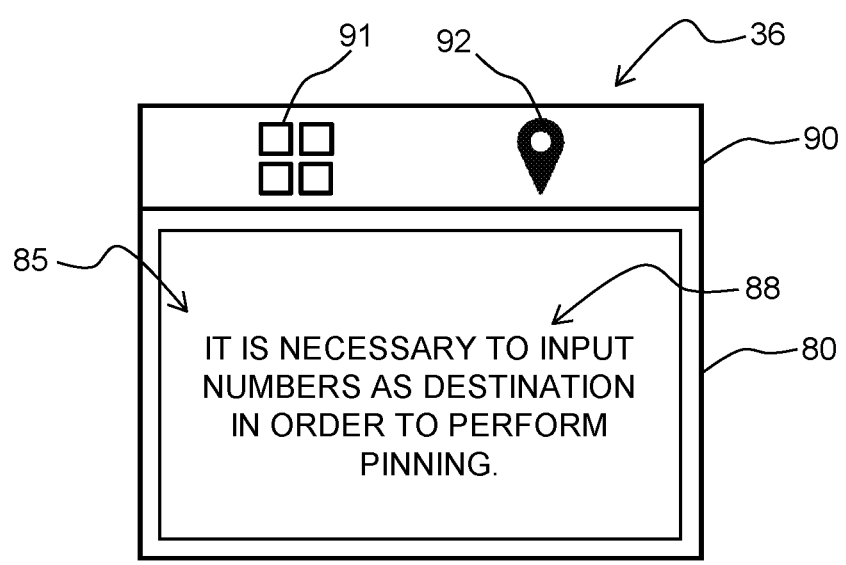
FIG. 12A shows an eighth display example displayed on the display unit of the image forming device.

A third display example of the confirmation screen 85 is displayed on the first display unit 80 shown in FIG. 12A. As an example, the CPU 31 displays, on the history screen 70 shown in FIG. 11C, the confirmation screen 85 shown in FIG. 12A in a case in which the pinning setting for the history icon 72B is received.

The caution information 88 is displayed on the confirmation screen 85 shown in FIG. 12A. The caution information 88 indicates a message to the user. As an example, in FIG. 12A, "it is necessary to input numbers to as the destination in order to perform pinning" is displayed as the caution information 88. The display content of the caution information 88 is changed for each problem of the job parameter, and other display contents such as "it is necessary to designate a domain other than a prohibited domain as the destination in order to perform pinning" and "it is necessary to designate a confidential box of the counterpart machine in order to perform pinning" are provided as an example.

Figure 12B:
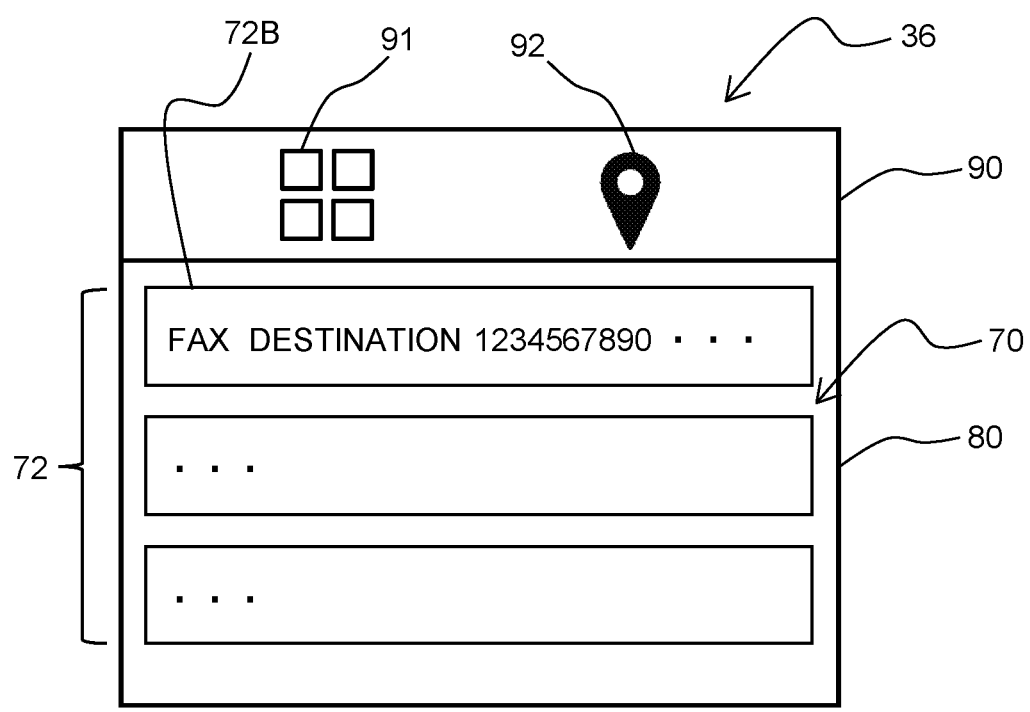
FIG. 12B shows the eighth display example displayed on the display unit of the image forming device.

A fifth display example of the history screen 70 is displayed on the first display unit 80 shown in FIG. 12B. FIG. 12B shows the history screen 70 after the job parameter of the history icon 72B shown in FIG. 11C is changed. Specifically, FIG. 12B shows the history screen 70 after "xxxx" input as the "destination" of the job parameter of the history icon 72B shown in FIG. 11C is changed to input numbers of "1234567890". The change operation is performed by an operation on the operation part 37 as an example.

Figure 12C:
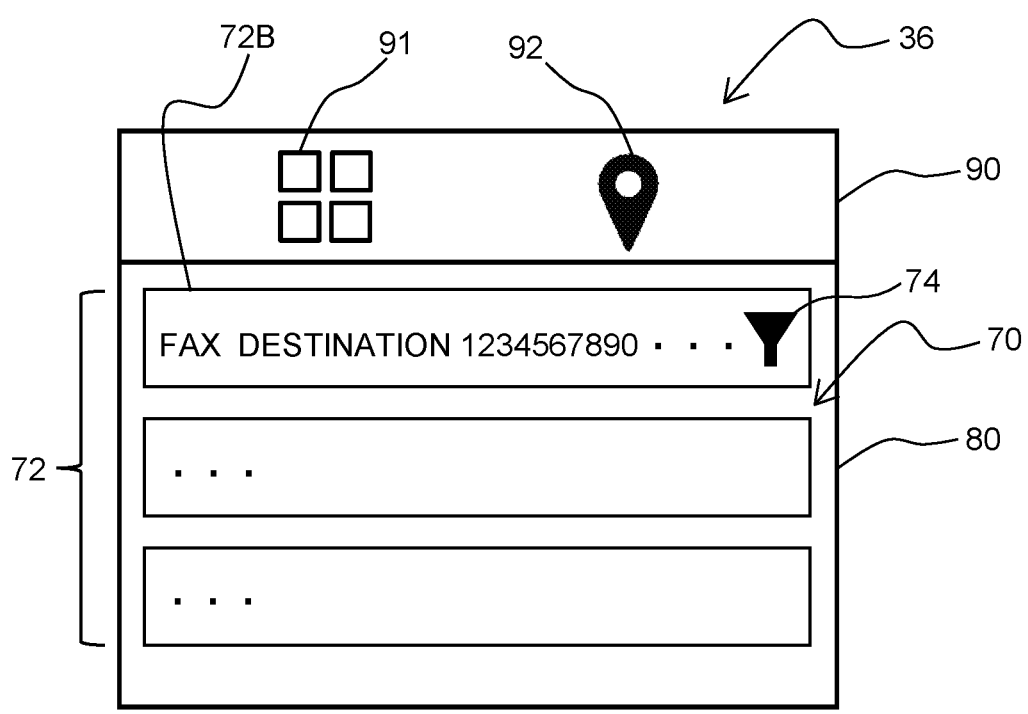
FIG. 12C shows the eighth display example displayed on the display unit of the image forming device.

A sixth display example of the history screen 70 is displayed on the first display unit 80 shown in FIG. 12C. As an example, FIG. 12C shows the history screen 70 in a case in which pinning is performed on the history icon 72B displayed at the uppermost portion of the history screen 70. As shown in FIG. 12C, numbers are input as the "destination" of the job parameter, and the pinning mark 74 is displayed in the history icon 72B that can be pinned.

In the above embodiment, the display region in the history screen 70 is not divided for the pinned history icon 72 and the unpinned history icon 72. However, the present disclosure is not limited thereto, and the display region may be divided.

FIG. 13 shows a ninth display example displayed on the display unit 36 of the image forming device 20.

A seventh display example of the history screen 70 is displayed on the first display unit 80 shown in FIG. 13. The history screen 70 shown in FIG. 13 is divided into a pinning region 75 surrounded by a broken line for displaying the pinned history icon 72 and a normal region 76 surrounded by a line with alternating long and short dashes for displaying the unpinned history icon 72.

FIG. 14 is a tenth display example displayed on the display unit 36 of the image forming device 20.

An eighth display example of the history screen 70 is displayed on the first display unit 80 shown in FIG. 14. FIG. 14 shows the history screen 70 after the history icon 72 displayed at the lower portion of the normal region 76 in FIG. 13 is pinned. At this time, when displaying the history icon 72 in the pinning region 75, the CPU 31 displays the history icon 72 at the uppermost portion of the pinning region 75, and moves the history icons 72 already displayed in the pinning region 75 downward one by one.

As described above, even the display position of the pinned history icon 72 may be moved on the history screen 70.

As in the above embodiment, in a case in which the display region in the history screen 70 is not divided for the pinned history icon 72 and the unpinned history icon 72, the pinned history icon 72 and the unpinned history icon 72 may be displayed side by side in chronological order.

In the above embodiment, the history icon 72 corresponding to the job whose execution result is "success" and the unpinned history icon 72 corresponding to the job whose execution result is "failure" has a common display mode on the history screen 70. However, the present disclosure is not limited thereto, and the display modes thereof may be different. As an example, at least one of the font, the character size, or the character color of each history icon 72 corresponding to the two types of jobs described above may be made different.

In the above embodiment, the pinning mark 74 has one type of display mode, but the present disclosure is not limited thereto, and the number of display modes that the pinning mark 74 may have may be plural. As an example, a plurality of pinning marks 74 having different at least one of shapes, sizes, or colors may be provided. As a result, the user can distinguish each job by the display mode of each pinning mark 74.

In the above embodiment, it may be possible to define the history icon 72 displayed on the history screen 70 in accordance with an instruction from the user. As an example, an end state (examples: error, warning, and normal) of the execution result of the job corresponding to the history icon 72 may be defined by the user. As a result, in a case in which each job is executed again, it is possible to cause the user to determine whether or not the execution result is "success". As an example, the execution result in a case in which the FAX job is executed again is "success" even when characters are garbled because a special character or the like used for a character string described in a transmission header, a transmission sheet, or the like cannot be converted in the FAX job, in a case in which the end state defined by the user is "normal".

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The disclosure of Japanese Patent Application No. 2021-023747 is incorporated herein by reference in its entirety.

All documents, patent applications, and technical standards mentioned herein are incorporated herein by reference to the same extent as if each individual document, patent application, and technical standard were specifically and individually stated.

The invention claimed is:

1. An information processing device, comprising a processor, wherein the processor is configured to:
   receive a setting for a job that is an instruction for executing a function,
   cause an operator associated with the setting for an executed job to be displayable on a history screen displaying a history of the executed jobs,
   in a case in which an operator displayed on the history screen is operated, apply the received setting for execution of a job corresponding to the operated operator,
   change a display mode, on the history screen, of the operator associated with the setting for a job that has not been completed normally in accordance with a behavior of the job that has not been completed normally,
   in a case in which the behavior of the job that has not been completed normally satisfies a predetermined condition, display a first confirmation screen for confirming whether or not to cause the operator corresponding to the job that has not been completed normally to be displayed on the history screen, and
   in a case in which the behavior of the job that has not been completed normally satisfies the predetermined condition and an operation was performed on the first confirmation screen to display the operator, cause the operator corresponding to the job that has not been completed normally to be displayed on the history screen.

2. The information processing device according to claim 1, wherein the processor is configured to:
 receive a pinning setting for distinguishing the operator corresponding to the job that has not been completed normally from other operators in accordance with an instruction from a user in a case in which the behavior of the job that has not been completed normally satisfies the predetermined condition, and
 in a case in which the behavior of the job that has not been completed normally does not satisfy the predetermined condition, perform control not to perform pinning of the operator corresponding to the job that has not been completed normally.

3. The information processing device according to claim 2, wherein the processor is configured to, in a case in which the number of operators displayable on the history screen exceeds a prescribed number, delete one or more unpinned operators from the history screen without deleting pinned operators from the history screen.

4. The information processing device according to claim 1, wherein a case in which the behavior of the job that has not been completed normally satisfies the predetermined condition is a case in which there is a possibility that the job will be normally completed when the job that has not been completed normally is executed again using a same setting as for the job that was not completed normally.

5. A non-transitory computer-readable medium storing an information processing program executable by a computer to perform processing comprising:
 receiving a setting for a job that is an instruction for executing a function;
 causing an operator associated with the setting for an executed job to be displayable on a history screen displaying a history of the executed jobs;
 in a case in which the operator displayed on the history screen is operated, applying the received setting for execution of a job corresponding to the operated operator;
 changing a display mode, on the history screen, of the operator associated with the setting for a job that has not been completed normally in accordance with a behavior of the job that has not been completed normally;
 in a case in which the behavior of the job that has not been completed normally satisfies a predetermined condition, displaying a first confirmation screen for confirming whether or not to cause the operator corresponding to the job that has not been completed normally to be displayed on the history screen; and
 in a case in which the behavior of the job that has not been completed normally satisfies the predetermined condition and an operation was performed on the first confirmation screen to display the operator, causing the operator corresponding to the job that has not been completed normally to be displayed on the history screen.

* * * * *